United States Patent
Miyashita (10) Patent No.: US 7,046,907 B2
(45) Date of Patent: May 16, 2006

(54) BACKLIGHT SYSTEM

(75) Inventor: Junji Miyashita, Fujiyoshida (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 0 days.

(21) Appl. No.: 11/055,018

(22) Filed: Feb. 11, 2005

(65) Prior Publication Data

US 2005/0191026 A1    Sep. 1, 2005

(30) Foreign Application Priority Data

Feb. 13, 2004    (JP)    ............ P2004-035837

(51) Int. Cl.
*G02B 6/10*    (2006.01)
(52) U.S. Cl. ..................... 385/146; 385/31
(58) Field of Classification Search ............ 385/31, 385/146
See application file for complete search history.

(56) References Cited

U.S. PATENT DOCUMENTS 5,050,946 A * 9/1991 Hathaway et al. ............ 385/33
5,748,828 A * 5/1998 Steiner et al. ............... 385/146
5,914,760 A * 6/1999 Daiku ......................... 349/65

FOREIGN PATENT DOCUMENTS

JP    2003-59321    2/2003

* cited by examiner

*Primary Examiner*—Ellen E. Kim
(74) *Attorney, Agent, or Firm*—Browdy and Neimark, PLLC (57) ABSTRACT

A backlight system comprising a light-guiding plate (1), a light emitting source (2) disposed to face a light-entrance surface (1c), which is a side surface of the light-guiding plate (1), a prismatic sheet (3) disposed at a position facing an upper surface (1a) of the light-guiding plate (1), and a reflecting sheet (4) disposed to face a lower surface (1b) of the light-guiding plate (1), light emitted from the light emitting source (2) enters the light-guiding plate (1), and the light being adapted so as to change the path thereof in the light-guiding plate (1) and then, the light is emitted from the upper surface of the light-guiding plate and enters the prismatic sheet (3), and the light is adapted to arrange a direction thereof in the prismatic sheet (3) to irradiate illumination light emitted from a from exit surface which is the upper surface (1a) of the prismatic sheet to an object, and the prismatic sheet (3) including a lens mechanism provided on the final exit surface and configured to refract the light in the prismatic sheet (3) and direct the light to the object.

8 Claims, 14 Drawing Sheets

BACKLIGHT SYSTEM

CROSS-REFERENCE TO THE RELATED APPLICATION

The application claims the priority benefit of Japanese Patent Application No. 2004-35837, filed on Feb. 13, 2004, the entire descriptions of which are incorporated herein by reference.

BACKGROUND OF INVENTION

1. Field of the Invention

The present invention relates to a backlight system used as an illumination means for a thin display such as a liquid crystal display (LCD) or the like.

2. Description of Related Art

Generally, a flat panel display such as an LCD panel used in a mobile phone, a notebook computer or the like includes a flat panel and a backlight system combined with the flat panel to illuminate it. An important condition as the backlight system is to provide a uniform light distribution having a sufficient strength throughout the entire surface of the flat panel in the LCD panel and so on.

Figure 8A:
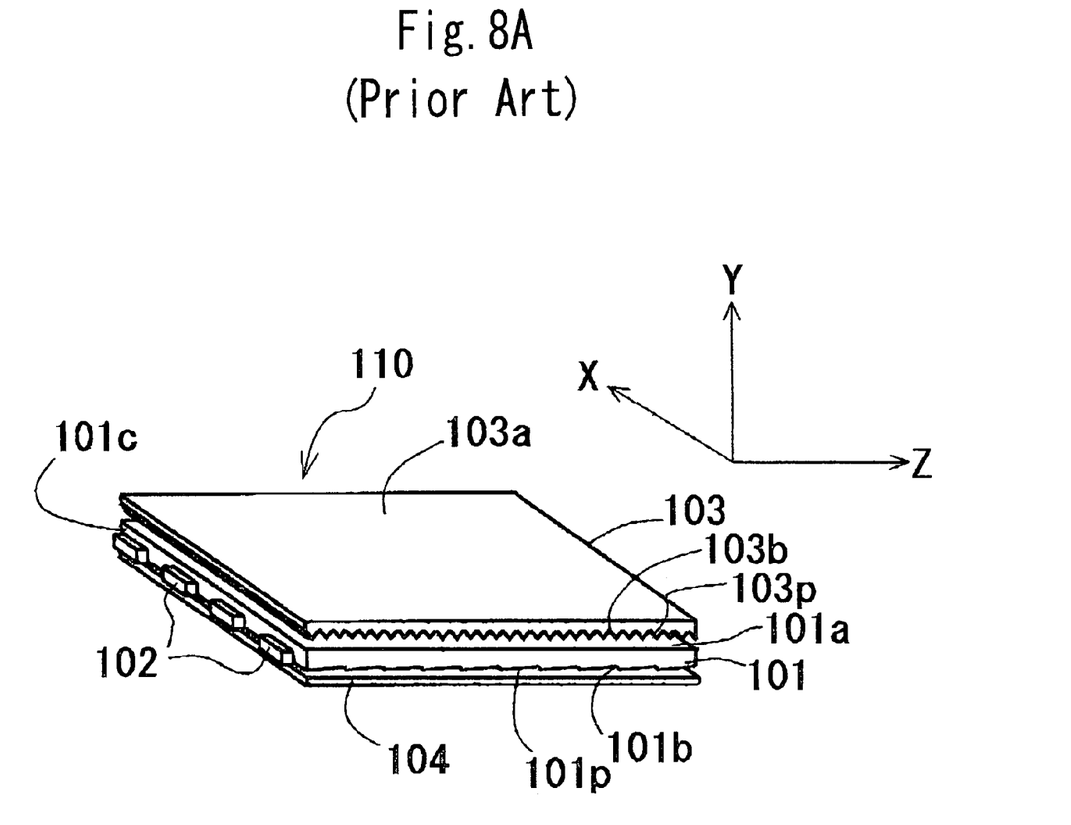
FIG. 8A is a perspective view of a conventional backlight system.
Figure 8B:
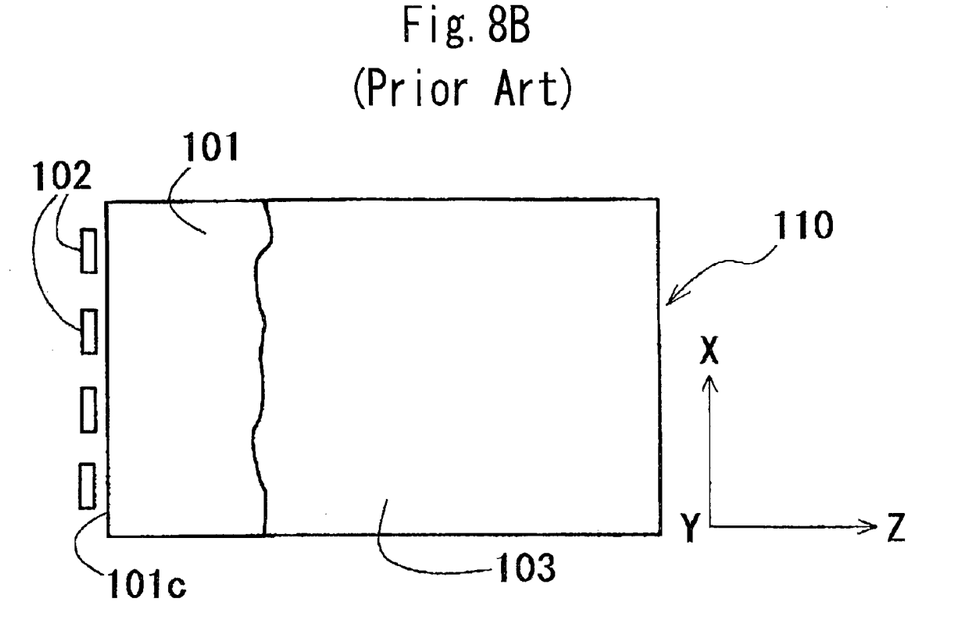
FIG. 8B is a plan view of the backlight system shown in FIG. 8A.
Figure 8C:
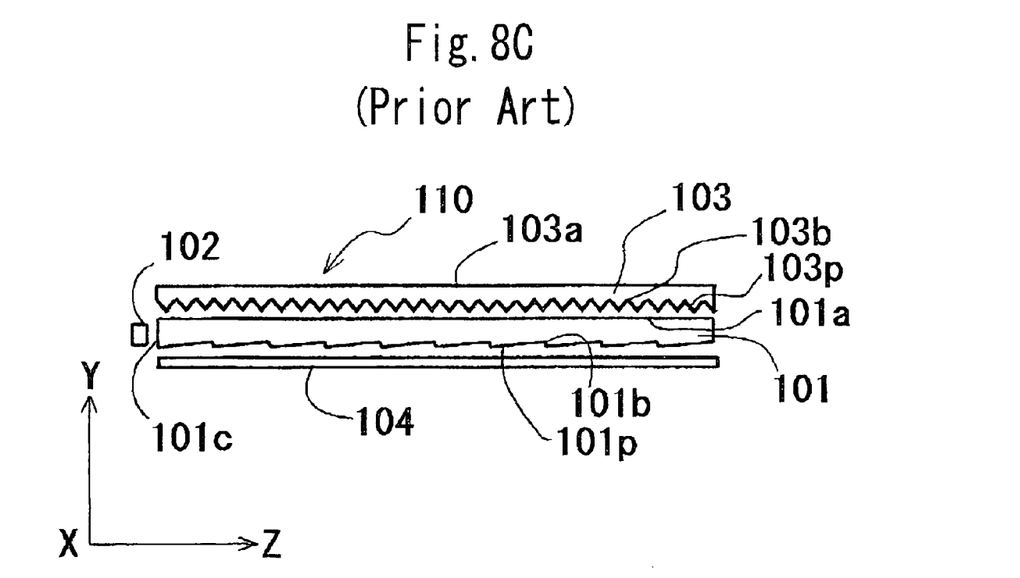
FIG. 8C is a side view of the backlight sync shown in FIG. 8A as viewed from a width direction thereof or X direction in orthogonal coordinates X, Y and Z.

Conventionally, there is known a backlight system using a light-guiding plate and a prismatic sheet, as shown in FIGS. 8A to 8C (for reference, see JPA 2003-59321, FIGS. 1 and 5).

X, Y, and Z directions in orthogonal coordinates, as shown in FIGS. 8A to 8C show a width direction, a thickness direction and a length direction of the backlight system 110, respectively. In FIGS. 8A to 8C, reference numeral 101 denotes a light-guiding plate, 102 an LED as a light-emitting source disposed at a position facing a light-entrance surface 100c which corresponds to a side surface of the light-guiding surface 101, 103 a prismatic sheet disposed to ice an upper surface 101a of the light-guiding plate 101, and 104 a reflecting sheet disposed to face a lower surface 101b of the light-guiding plate 101.

Figure 9:
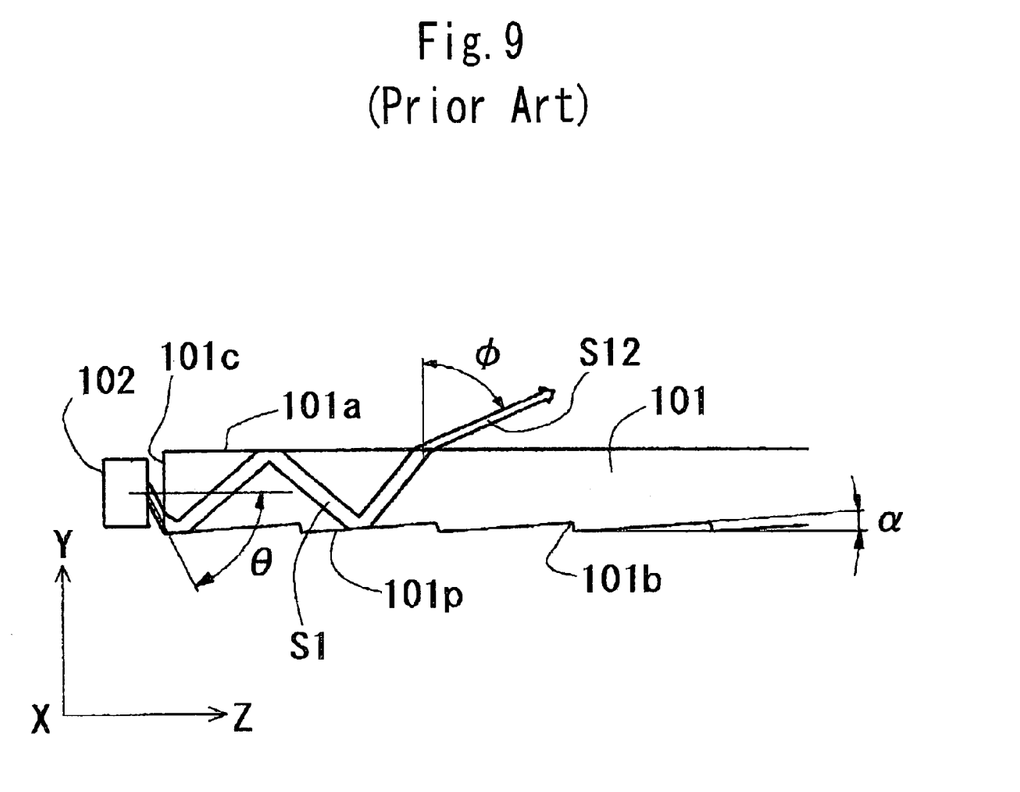
FIG. 9 is a view showing an operation of the light-guiding plate used in the backlight system shown in FIG. 8A.

The upper surface 101a of the light-guiding plate 101 is formed in a smooth see, and the lower surface 101b of the light-guiding plate 101 is provided with a plurality of prisms 101p having prismatic surfaces standing obliquely to the Z direction at a relatively small inked angle (see α, in FIG. 9). On the other hand, a lower surface 103b of the prismatic sheet 103 facing the light-guiding plate 101 is provided with a plurality of prisms 103p projecting at acute angles, for example, 60 to 75 degrees.

In the backlight system 110, as shown in FIG. 9, a beam S1 from the LED 102 entering the light-entrance surface 101c of the light-guiding plate 101 at an angle θ is refracted by the light-entrance surface 101c and enters surfaces of the prisms 101p on the lower surface of the light-guiding plate 101 at an angle lesser than the angle θ by refraction of the light-guiding plate 101.

Here, the beam S1 comprises a flux of parallel light. At this time, if an incident angle to the surfaces of the prisms 101p is more than a critical angle for example, it is 40 degrees, if a refraction index of the light-guiding plate 1 is 1.55), the beam S1 is reflected on the surfaces of the prisms and enters the upper surface 101a of the light-guiding plate 101. Here, if an incident angle to the upper ace 110a is lesser than a critical angle, the beam passes through the upper surface 110a by refraction of the light-guiding plate 101 and emits to the outside. However, if the incident angle is the critical angle or more, the beam is reflected on the upper sure and enters the sues of the prisms 101p on the lower surface 101b, as shown in FIG. 9. Because the prisms 101p have inclined angles α, the incident angle of the entered beam S1 in the upper surface 101p as the reflected light decreases by 2α every time that the beam is reflected on the prisms 101p. Therefore, after the beam is reflected on the surfaces of the prisms 101p one time or multiple times, the incident angle to the upper surface 101a is lesser than the critical angle, the beam passes through the upper surface 101a by refraction thereof and emits to the outside as a beam S12 having an exit angle φ.

Here, the inclined angle α is often set to a small angle in order to improve the transfusion of inside light in the light-guiding plate 101. In this case, even though the incident angle to the upper surface 101a is lesser than the critical angle, the incident angle becomes an angle close to the critical angle. Accordingly, the exit angle φ is easy to be a large angle, for example, an angle exceeding 60°.

Figure 10A:
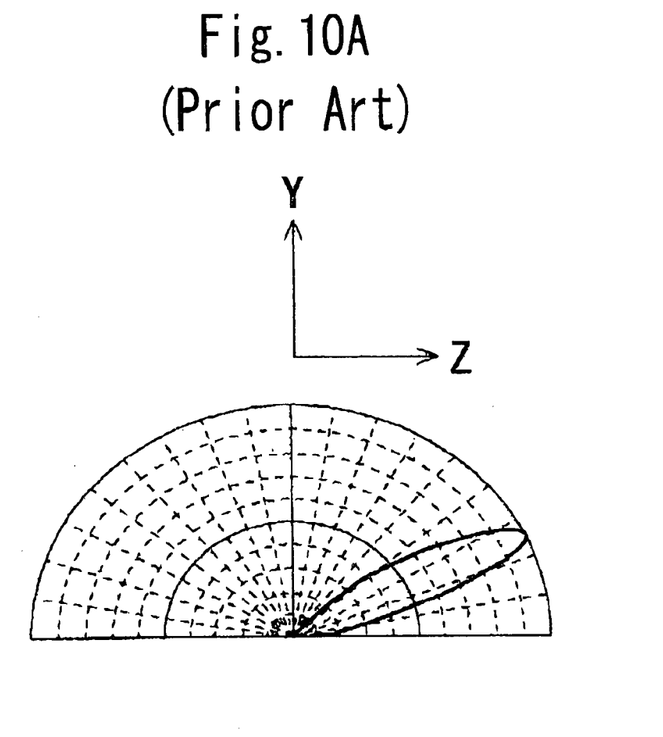
FIG. 10A is a view showing directivity of emitted light from the light-guiding plate in a Z-Y plane.
Figure 10B:
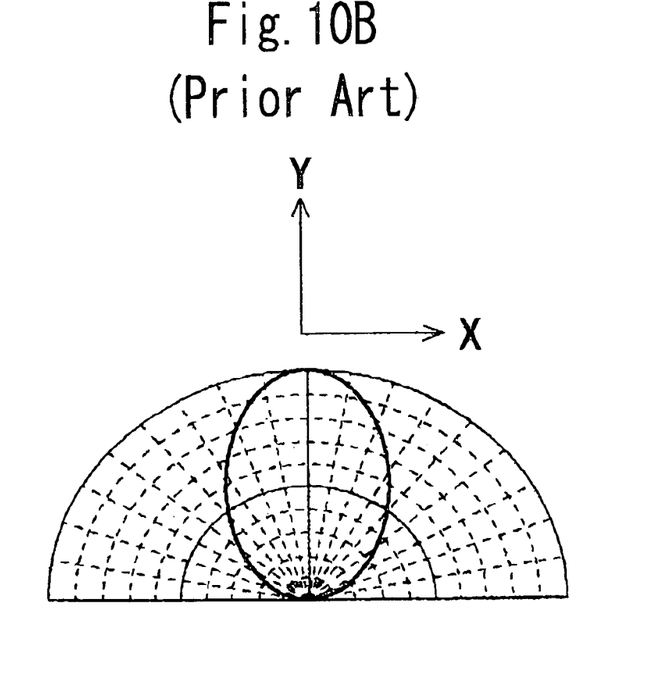
FIG. 10B is a view showing directivity of emitted light from the light-guiding plate in an X-Y plane.

FIGS. 10A and 10B illustrate the directivity of the emitted light from the upper surface 101a of the light-guiding plate 101, as shown in FIG. 9.

FIG. 10A illustrates the directivity in a ZY plane, and FIG. 10B illustrates the directivity in an XY plane.

Referring generally to FIG. 10A, the emitted light from the upper surface shifts to the Z direction, the emitted light has less components in the Y direction or a perpendicular direction. In such a state, it is not possible to provide sufficiently a component of illumination light in the perpendicular direction effective to illuminate an object, for example, an LCD panel or the like and thus acquiring brightness for illumination required to the backlight system is difficult. Therefore, the prismatic sheet 103 is disposed in order to direct the emitted light from the light-guiding plate 101 to the Y direction.

Meanwhile, there is a case that the incident angle of the inside light S1 entering the surfaces of the prisms 101p on the lower surface of the light-guiding plate 101, directly or through the reflection on the upper surface 101a is lesser than the critical angle. In this case, the entered light in the light-guiding plate passes through the surfaces of the prisms 101p by the refraction thereof, arrives the reflecting sheet 104 (see FIG. 5A), is reflected thereon, passes through the surfaces of the prisms 101p, again, and enters the light-guiding plate 101. In this way, it is possible to increase usability of the inside light in the light-guiding plate.

Figure 11:
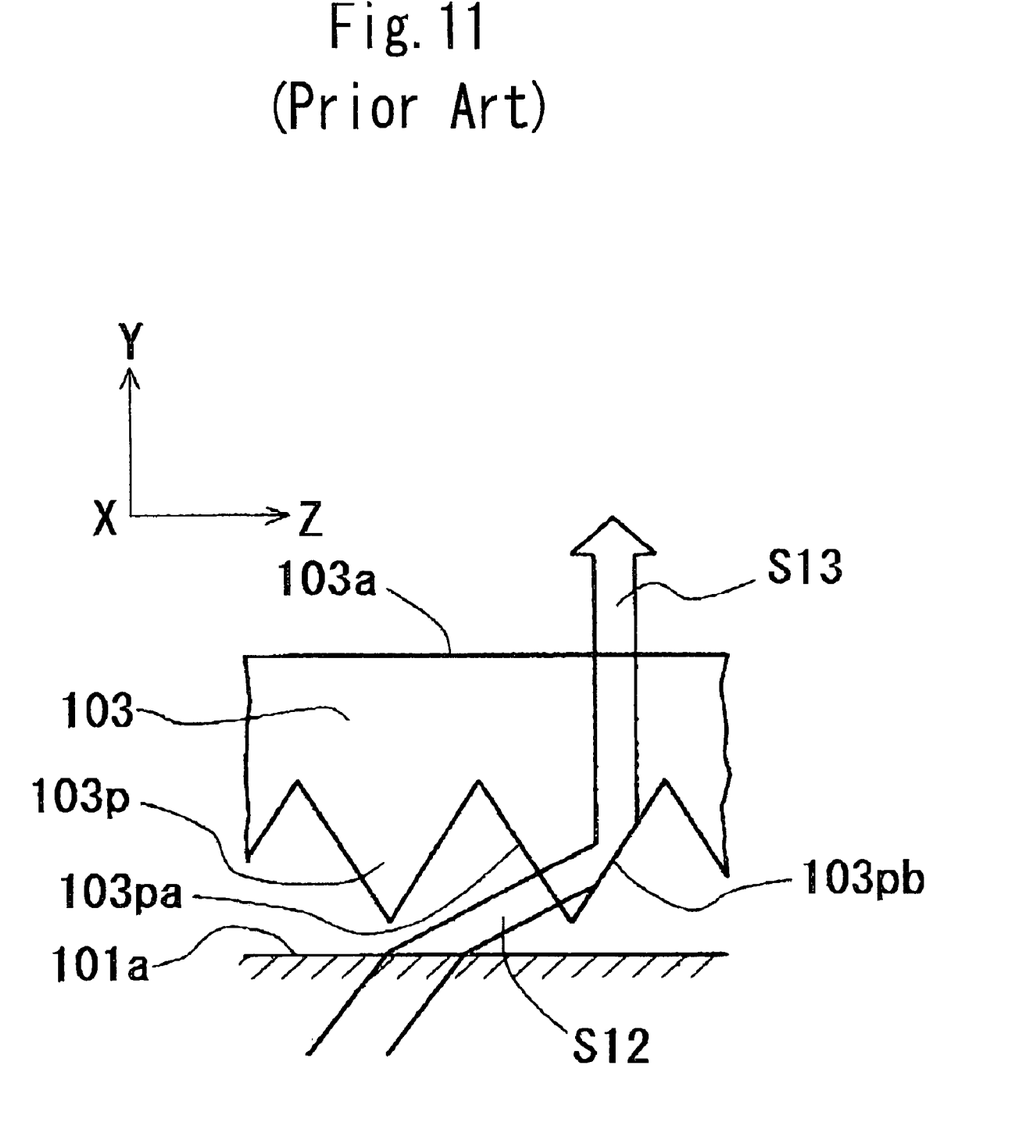
FIG. 11 is a view showing an operation of the prismatic sheet used in the backlight system shown in FIG. 8A.

FIG. 11 illustrates an operation of the prismatic sheet 103. As viewing from the ZY plane as shown in FIG. 11, the emitted beam S12 from the upper surface 101a of the light-guiding plate 101 enters an inclined surface 103pa of each of the prisms 103p provided on the lower surface of the prismatic sheet 103 facing the light-guiding plate 101, at an angle close to perpendicular, in other words, an incident angle close to 0 degree, goes in the prismatic sheet 103 without refracting almost, enters an inclined surface 103pb opposite across ridge lines of each prism, is reflected totally thereon, goes approximately perpendicularly upward or the Y direction, and emits from the upper surface 103a of the prismatic sheet 103 without refracting almost as an illumination beam 13. Here, the upper surface 103a of the prismatic sheet 103, which corresponds to a final exit surface is formed in a smooth surface or simple rough surface. In this way, because the beam S12 of the emitted light from the light-guiding plate is reflected on the prismatic sheet 103 directly almost as a flux of parallel light and alternates the direction only, the illumination beam S13 as the backlight system which is a final exit light is substantially a parallel beam, the directivity of the illumination light collecting the parallel beam is narrow in the length direction of the backlight system or the Z direction. Even if the final exit surface is the simple rough surface, the directivity in the Z direction has a slight broadening.

Figure 12A:
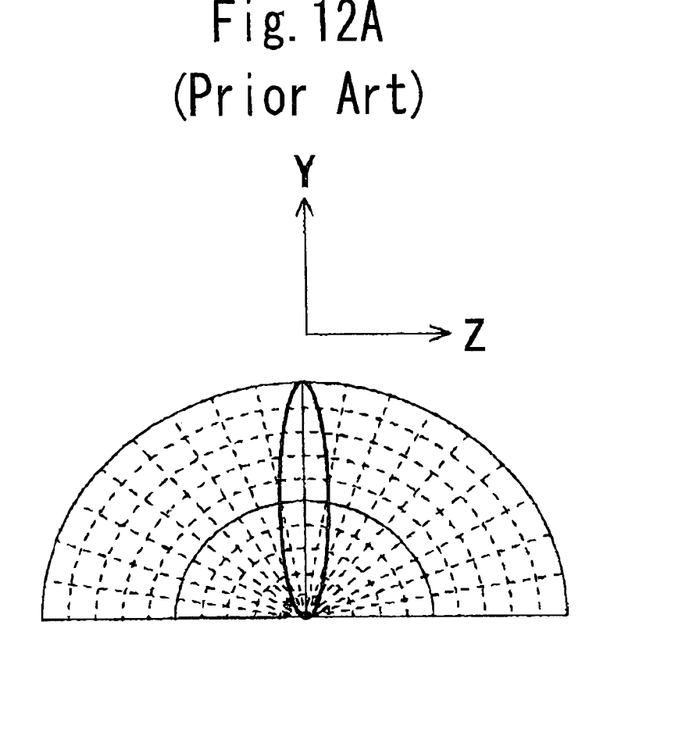
FIGS. 12A and 12B are views showing directivity of illumination light of the backlight system shown in FIG. 8A.
Figure 12B:
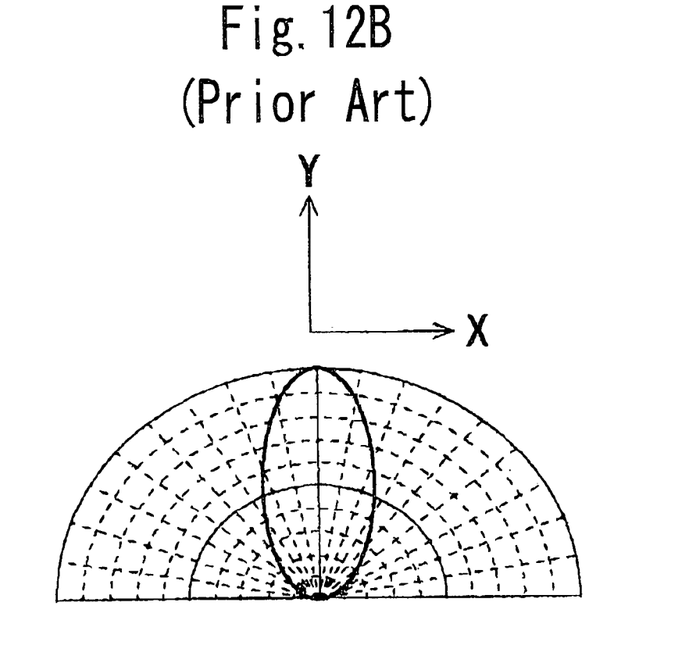

FIG. 12A illustrates the directivity of light in the ZY plane, and FIG. 12B illustrates the directivity of light in the XY plane. As is clear from the drawings, the directivity of the backlight system has a large component with respect to the Y direction, an amount of light entering a flat panel (not shown) is increased efficiently, hence enhancing the entire brightness for illumination is effective. However, a width of directivity in the Z direction as shown in FIG. 12A is less considerably in comparison with that of the X direction as shown in FIG. 12B to obstruct a uniform illumination. Therefore, there is a possibility of generating a stripe pattern of bright and dark contrasting. As a result, there is a problem that quality of illumination is lower.

SUMMARY OF INVENTION

The present invention has been made in view of the above problems in the prior art and an object thereof is to provide a backlight system in which directivity for illumination light is improved.

To accomplish the above object, a backlight system in an aspect of the present invention comprises a light-guiding plate having an upper surface, a lower surface and a light-entrance surface, a light emitting source disposed to face the light-entrance surface of the light-guiding plate, and a prismatic sheet disposed at a position facing the upper surface of the light-guiding plate and having a final exit surface for light disposed to face an object to be irradiated.

The emitted light from the light emitting source through the light-entrance surface entered in the light-guiding plate is adapted so as to change the path thereof in the light-guiding plate and enter from the upper surface into the prismatic sheet, and adapted to arrange a direction thereof by the prismatic sheet to irradiate illumination light emitted from the final exit surface to the object.

The prismatic sheet includes a lens mechanism provided on the final exit surface and configured to refract the light in the prismatic sheet and direct to the object.

In one embodiment, the lens mechanism has a plurality of lenticular lens parts, which are continuously disposed.

Each of the plurality of lenticular lens parts has a surface, which faces to the object and is formed in a convex shape, and the plurality of lenticular lens parts are disposed to end in parallel with the light-entrance surface of the light-guiding plate.

Moreover, each of the plurality of lenticular lens parts has a surface, which faces to the object and is formed in a concave shape, and the plurality of lenticular lens parts are disposed to extend in parallel with the light-entrance surface of the light-guiding plate.

DETAILED DESCRIPTION OF THE PREFERRED EMBODIMENTS

Preferred embodiments of the present invention will be explained with reference to the accompanying drawings below.

FIGS. 1A to 1D illustrate a structure of a backlight system 10 in a first embodiment according to the present invention.

X, Y and Z directions in orthogonal coordinates shown in FIGS. 1A to 1D show a width direction, a thickness direction and a length direction of the backlight system 10, respectively. In FIGS. 1A to 1D, reference numeral 1 denotes a light-guiding plate, 2 an LED as a light-emitting source disposed at a position facing to a light-entrance sure 1c, which is a side surface of the light-guiding surface 1, 3 a prismatic sheet disposed to face an upper surface 1a of the light-guiding plate 1, and 4 a reflecting sheet disposed to face a lower surface 1b of the light-guiding plate 1. The prismatic sheet 3 is disposed to face an object to be irradiated, for example, a display (not shown).

Figure 2:
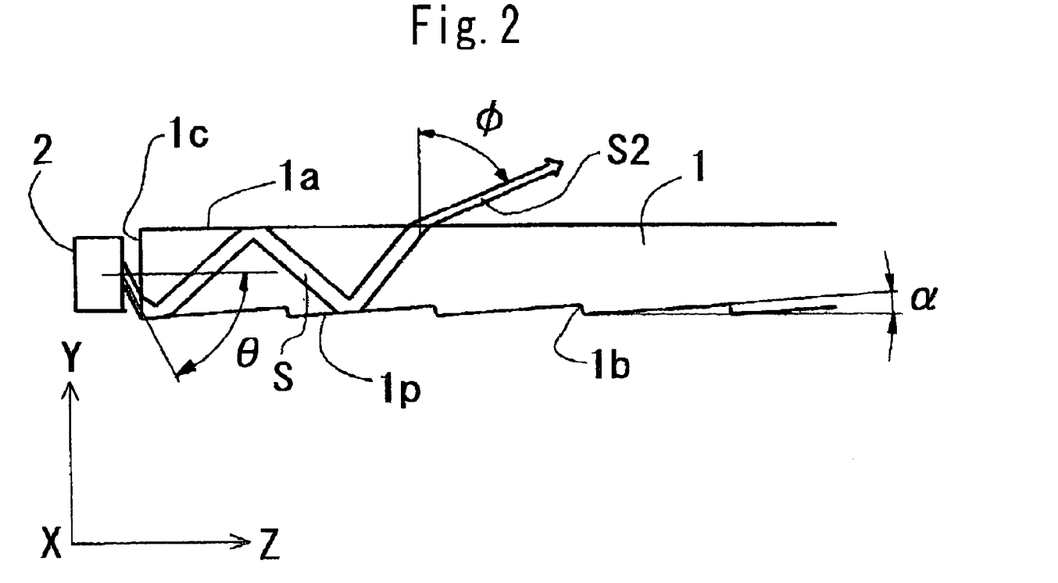
FIG. 2 is a view for explaining an operation of a light-guiding plate used in the backlight system as shown in FIG. 1A

The light-guiding plate 1 is made of a transparent plastic, the upper surface 1a thereof forms a smooth surface, and the lower surface 1b thereof is provided with a plurality of prisms 1p having prismatic surfaces inclining so as to stand toward the Z direction at a relatively small inclined angle (see α in FIG. 2). On the other hand, the prismatic sheet 3 is also made of a transparent plastic and has a lower surface 3b, which is disposed to face the upper surface 1a of the light-guiding plate 1 and is provided with a plurality of prisms 3p projecting at acute angles, for example, 60 to 75 degrees.

A lens mechanism is provided on an upper surface 3a of the prismatic sheet 3 opposing to the lower surface 3b on which the prisms 3p are formed. The lens mechanism acts to refract the light in the prismatic sheet and direct the refracted light to the object. The lens mechanism has a plurality of lenticular lens parts 3L, which are disposed continuously. In the first embodiment, each of the plurality of lenticular lens parts 3L has a surface, which faces to the object to be irradiated and forms a convex-like shape (see FIG. 1D), and the plurality of lenticular lens parts 3L are disposed to extend in parallel to the light-entrance surface 1c (see FIG. 1B).

The prisms 3p have a plurality of concave and convex shapes disposed continuously, ridge lines of the concave and convex shapes are formed to extend in parallel to the light-entrance surface 1c of the light-guiding plate 1. Prisms 1p are provided on the lower surface 1b of the light-guiding plate 1. The prisms 1p have a plurality of concave and convex shapes, which are disposed continuously, ridge lines of the concave and convex shapes are formed to extend in parallel with the light-entrance surface 1c of the light-guiding plate 1.

In addition, surfaces of the convex lenticular lens parts 3L are formed in final exit surfaces for emitting the irradiated light from the backlight system 10, as described hereinafter.

Figure 1A:
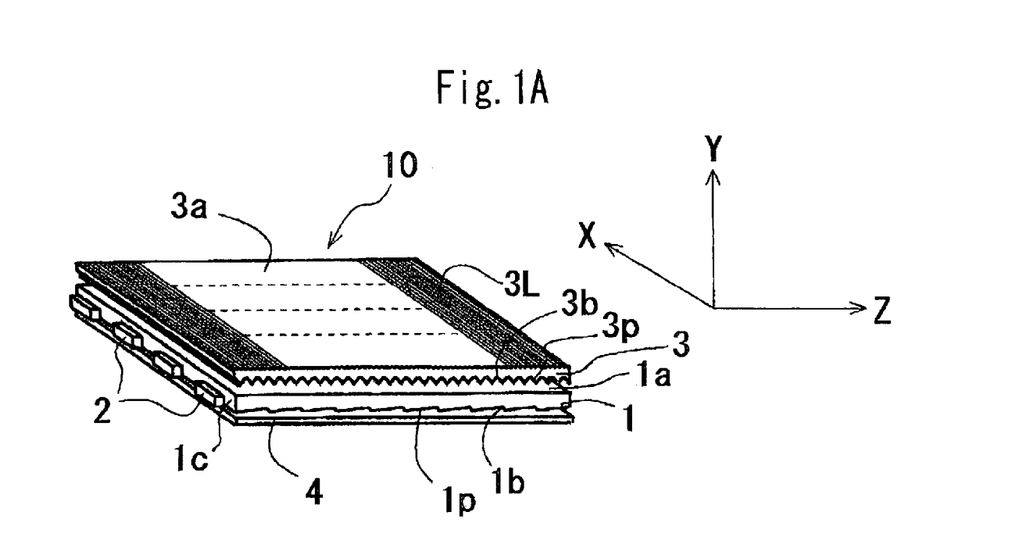
FIG. 1A is a perspective view showing a backlight system in a first embodiment according to the present invention.
Figure 1B:
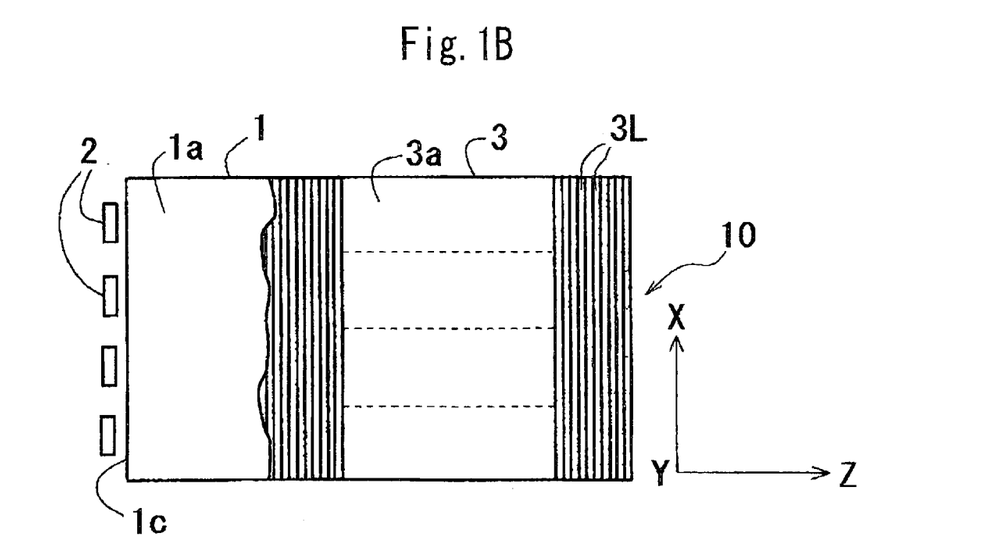
FIG. 1B is a plan view of the backlight system shown in FIG. 1A.
Figure 1C:
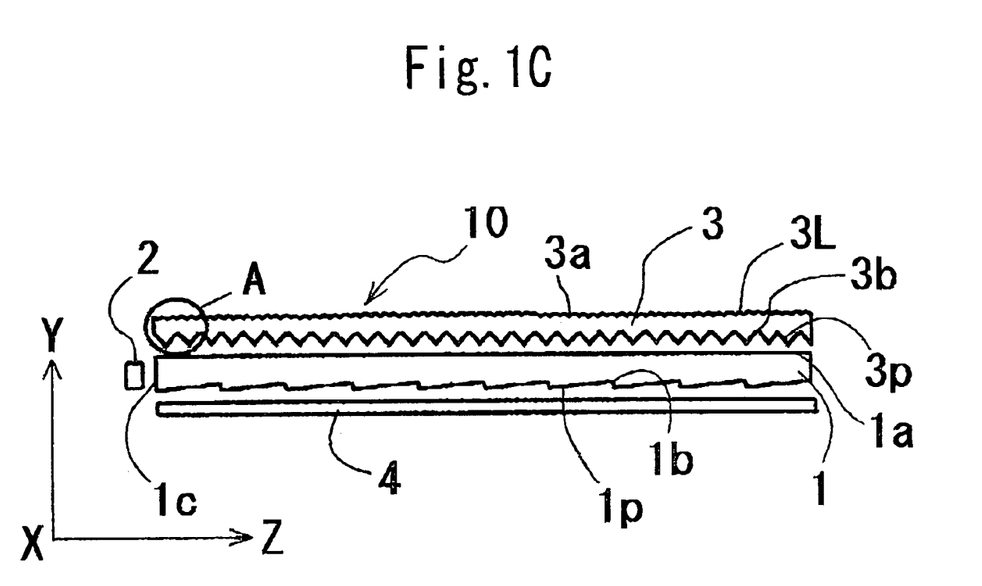
FIG. 1C is a side view showing the backlight system in FIG. 1A as viewed from a width direction thereof or X direction in orthogonal coordinates X, Y and Z.
Figure 1D:
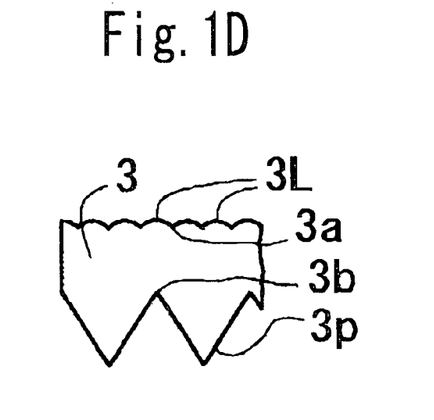
FIG. 1D is an enlarged view of a portion A in FIG. 1C.

Here, both the ridge lines or bus lines of the prisms 3p and the lenticular lens parts 3L are directed in the X direction and are parallel with respect to each other, as shown in FIGS. 1A and 1B. In addition, the ridge lines of the prisms 1p on the lower surface 1b of the light-guiding plate 1 are also directed in the X direction.

Figure 3:
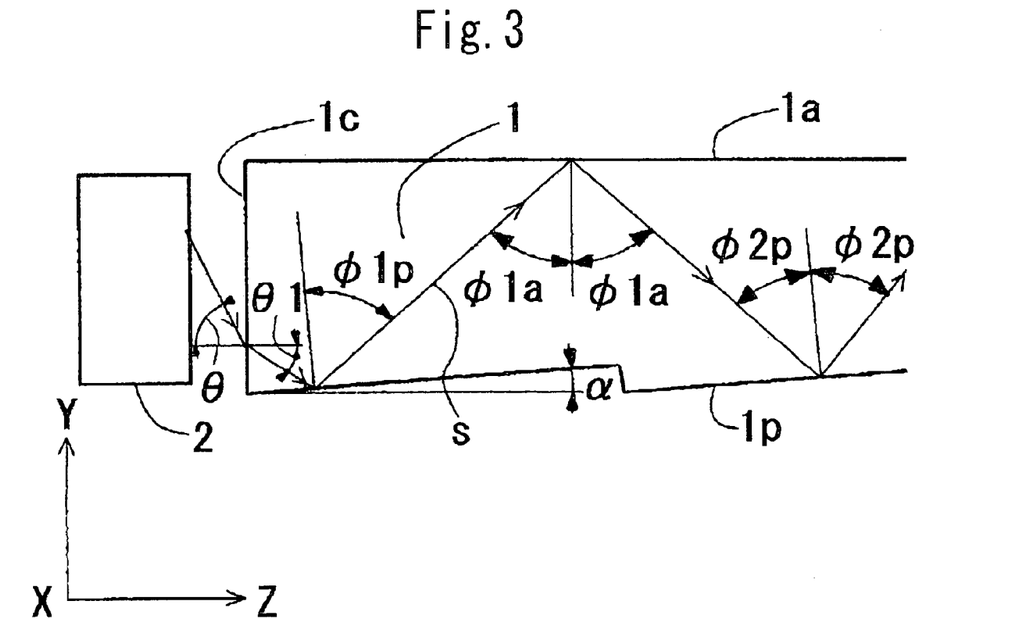
FIG. 3 is a view for explaining the operation of the light-guiding plate used in the backlight system as shown in FIG. 1A, in more detail.

FIGS. 2 and 3 illustrate an operation of the light-guiding plate 1. As shown in FIG. 2, a beam S from the LED 2 entering the light-entrance surface 1c of the light-guiding plate 1 at an angle θ is refracted by the light-entrance race 1c and entered into the light-guiding plate 1 with an angle lesser than the angle θ, and then enters the surfaces of the prisms 1p on the lower surface 1b.

In this case, the beam S comprises a flux parallel light. After the beam S enters the light-guiding plate 1 in such a way, an incident angle of the beam decreases every times that the beam is reflected on the prisms 1p on the lower surface by the same principle as in the description made in FIG. 9, when an incident angle to the upper surface 1a becomes lesser than a critical angle (for example, it is 40 degrees, if a refraction index of the light-guiding plate 1 is 1.55), at the first time, the beam passes through the upper surface by refraction to emit to the outside as a beam S2 having a considerable sized exit angle φ, 60 degrees or more, for example.

FIG. 3 is a view for explaining an operation of the light-guiding plate with respect to one ray(s) of light included in the beam S, in more detail. As shown in FIG. 3, the ray of light (s) is directed from the LED 2 to the light-entrance surface 1c of the light-guiding surface 1 at the angle θ, and refracted at the light-entrance surface.

If the fraction index (n) of the light-guiding plate is 1.55, an angle θ1 is obtained by the following formula (1) under the Snell's Law.

$$\theta 1 = \sin^{-1}[(\sin \theta)/1.55] \quad (1)$$

The ray of light (s) enters the light-guiding plate 1 at a considerable lesser angle θ1 than the incident angle θ, and the entered light enters one surface of the prisms 1p, each of which has the inclined angle α, at an incident angle $\phi 1p = 90° - \theta 1 - \alpha$. Here, if the incident angle φ1p is a critical angle or more, the ray of light is totally reflected, and enters the upper surface 1a of the light-guiding plate 1 at an incident angle $\phi 1a = 90° - \theta 1 - 2\alpha$. In this case, if the incident angle φ1a is a critical angle or more, the ray of light (s) is Faber reelected on the upper surface and is directed to the prisms 1p on the lower surface 1b and the ray of light(s) enters the prisms 1p at an incident angle $\phi 2p = 90° - \theta 1 - 3\alpha$. In this way, the incident angle toward the upper surface 1a decreases by 2α every time of receiving the reflection one time on the prisms 1p on the lower surface of the light-guiding plate. In other words, if an incident angle to the upper surface 1a is φna, when the ray of light is subject to reflect on the prisms 1p, n times, the formula is satisfied.

$$\phi na = 90° - \beta - 2n\alpha \quad (2)$$

That is to say, the incident angle to the upper surface 1a decreases every time that the ray of light is reelected on the upper surface 1a, repeatedly, and therefore the incident angle becomes lesser than the critical angle. At this time, the ray of light passes through the upper surface 1a and emits to the outside at the exit angle φ as exemplified in FIG. 2.

If the θ1 is 30°, α6°, and the critical angle 40°, when the ray of light is reflected on the prisms 1p on the lower surface one time, the incident angle φ1a to the upper surface 1a is 60°−12°=48° by the formula (2). As a result, the ray of light is reflected on the upper surface at an angle greater than or equal to the critical angle. However, if the ray of light is reflected on the prisms 1p twice, the incident angle φ2a to the upper surface 1a is 60°−24°=36°, which is less than the critical angle 40°, therefore the entered light in the light-guiding plate passes through the upper surface 1a at the exit angle φ by the refraction thereof and is emitted therefrom, as shown in FIG. 2. In this case, because the incident angle φ2a is near the critical angle, the exit angle φ of the emitted light S2 shown in FIG. 2 is more, for example, than 60°.

Consequently, the directivity of the emitted light S2 from the light-guiding surface 1 is in such a manner that a port of the Y direction is less, and disposed to shift to the Z direction, similarly as in the conventional art as shown in FIG. 10 A.

Next, if the incident angle of the light entering surfaces of the prisms 1p on the lower surface 1b of the light-guiding plate 1 is within the critical angle, light is emitted from the lower surface of the light-guiding plate 1 and the light is directed to the reflecting sheet 4 which is disposed to face the lower surface of the light-guiding plate. The reflecting sheet 4 (see FIG. 1) is adapted to reflect the emitted light from the light-guiding plate and return the light to the light-guiding plate. As a result, the reflecting sheet acts to improve the usability of light.

An operative principle of the light-guiding plate 1 and the reflecting sheet 4 is the same as in the conventional backlight system 110 as already described in FIGS. 8 and 9, therefore is known, but, is described herein as sequence for explaining the first embodiment.

Figure 4:
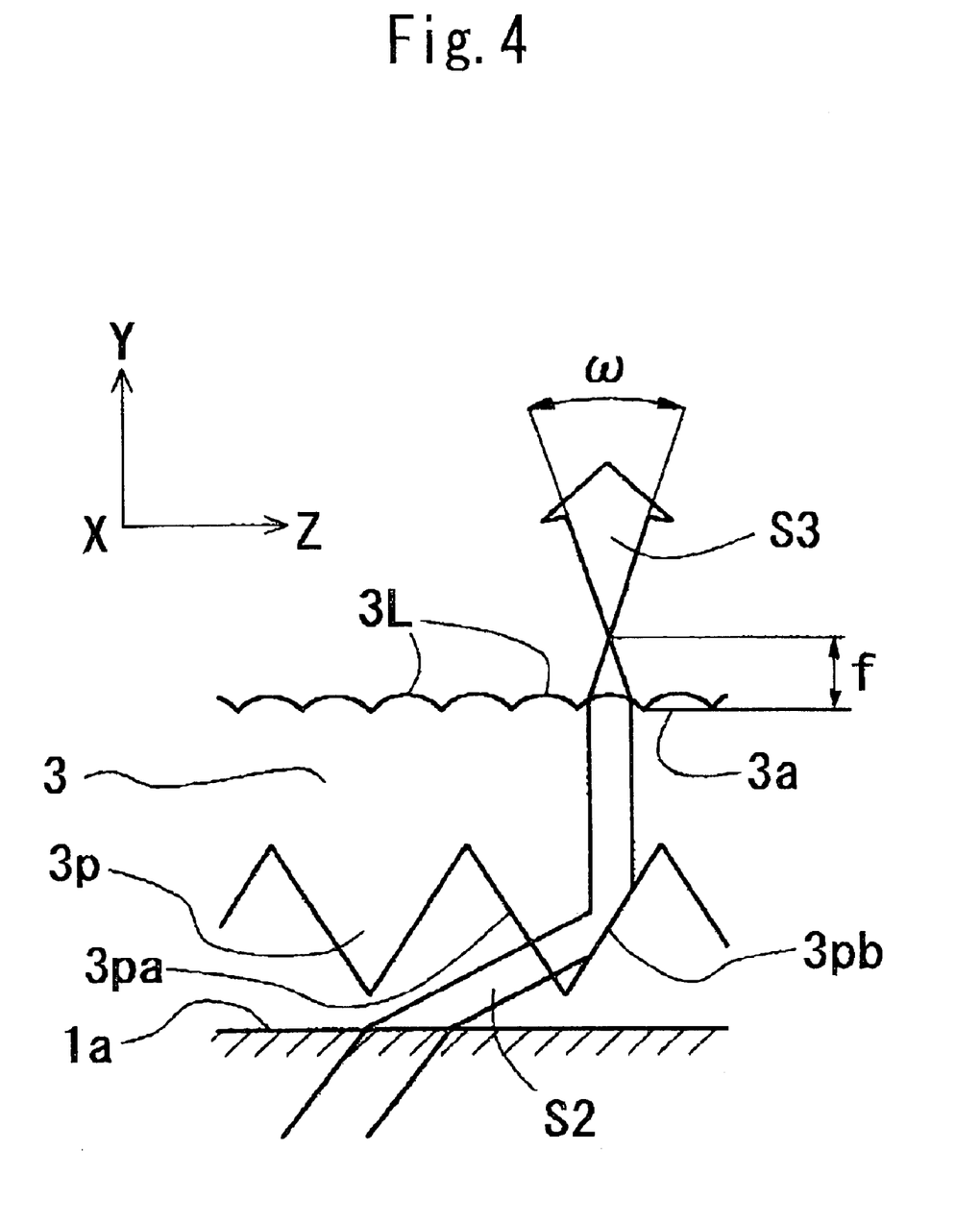
FIG. 4 is a view showing an operation of a prismatic sheet used in the backlight system shown in FIG. 1A FIGS. 5A and 5B are views showing directivity of illumination light of the backlight system shown in FIG. 1A

FIG. 4 illustrates an operation of the prismatic sheet 3 in the backlight system 10 in the first embodiment in the present invention. As shown in FIG. 4, the emitted beam S2 from the upper surface 1a at the exit angle φ (see FIG. 2) enters a left inclined surface 3pa of each of the pins 3p provided on the lower surface 3b of the prismatic sheet 3 facing the light-guiding plate 1. In this case, if an apex angle of each of the prisms 3p is within a predeterminate angular range corresponding to the exit angle φ, the beam enters the left inclined surface 3pa at an angle close to 90 degrees, is not refracted almost, goes in the prisms 3p, enters a right inclined surface 3pb, is totally reflected thereon, goes approximately perpendicularly upward or the Y direction, arrives at the convex lenticular lens parts 3L formed on the upper surface 3a of the prismatic sheet 3 and then passes through the surfaces of the convex lenticular lens part 3L by the refraction thereof and is emitted therefrom to the outside.

Each of the lenticular lens parts 3L curves upwardly in a convex shape on a plane shown in FIG. 4, or a Z plane, and extends straightly in a state of holding the curved shape in a perpendicular direction to the paper surface of FIG. 4, or the X direction. The emitted beam from the lenticular lens parts 3L, which correspond to the final exit surface is collected at a position remote by a focal length f once by refraction of light, thereafter the beam disperses in the Z direction in a ZY plane with an angle ω, which is approximately equal to an angle when collecting, thereby to become a final illumination beam S3. In this way, with the dispersed illumination beam S3, the directivity of the illumination light in the backlight system is improved.

The manner is explained with reference to FIG. 5, which illustrates a characteristic of the directivity.

Figure 5A:
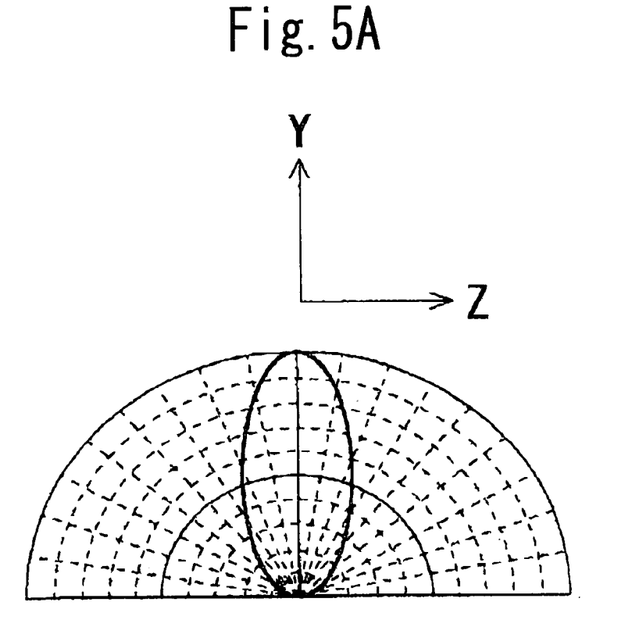
Figure 5B:
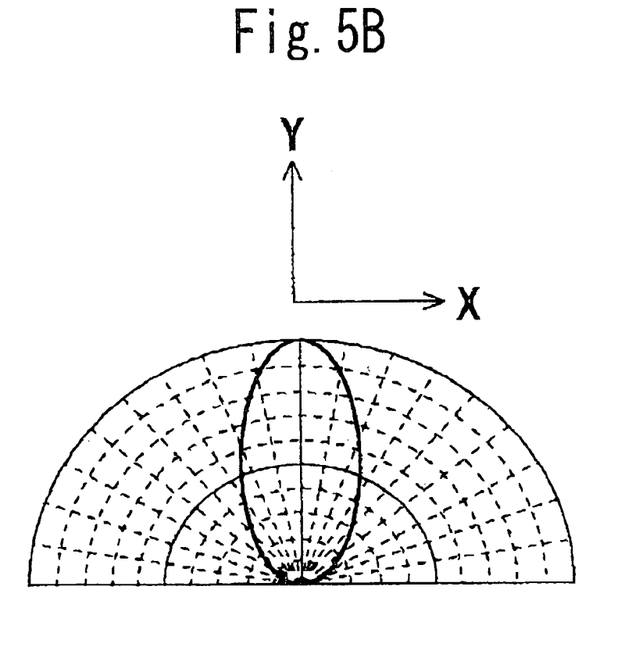

According to the backlight system 10 in the first embodiment, as shown in FIG. 5A, it is possible to further widen a width of the directivity in the Z direction in the ZY plane of the illumination light of the backlight system 10 in comparison with the conventional art (see FIG. 12A).

On the other hand, the emitted light from the lenticular lens parts 3L is not collected nor dispersed by all operation of the lenticular lens parts in a perpendicular direction to the surface of FIG. 4, or the X direction, because the surfaces of the lenticular lens parts are not curved. Accordingly, the width of the directivity in the X direction in an XY plane, in the backlight system 10 according to the first embodiment as shown in FIG. 5B is the same as that in the conventional backlight system as shown in FIG. 12. Consequently, it is possible to equalize sizes of the directivities of the backlight system 10 in the Z direction or length direction and the X direction or width direction in the first embodiment, thereby forming a backlight system having a higher quality for illumination. In addition, because the directivity of the backlight system 10 in the Z direction can be adjusted by changing a curvature of each of the lenticular lens parts 3L, the focal length thereof, and the angle ω for dispersing, the sizes of the directivities of the backlight system 10 in the Z direction and the X direction can be equalized completely or set to a desired proportion for any purpose.

Next, a second embodiment of the backlight system according to the present invention is described with reference to the accompanying drawings.

Figure 6A:
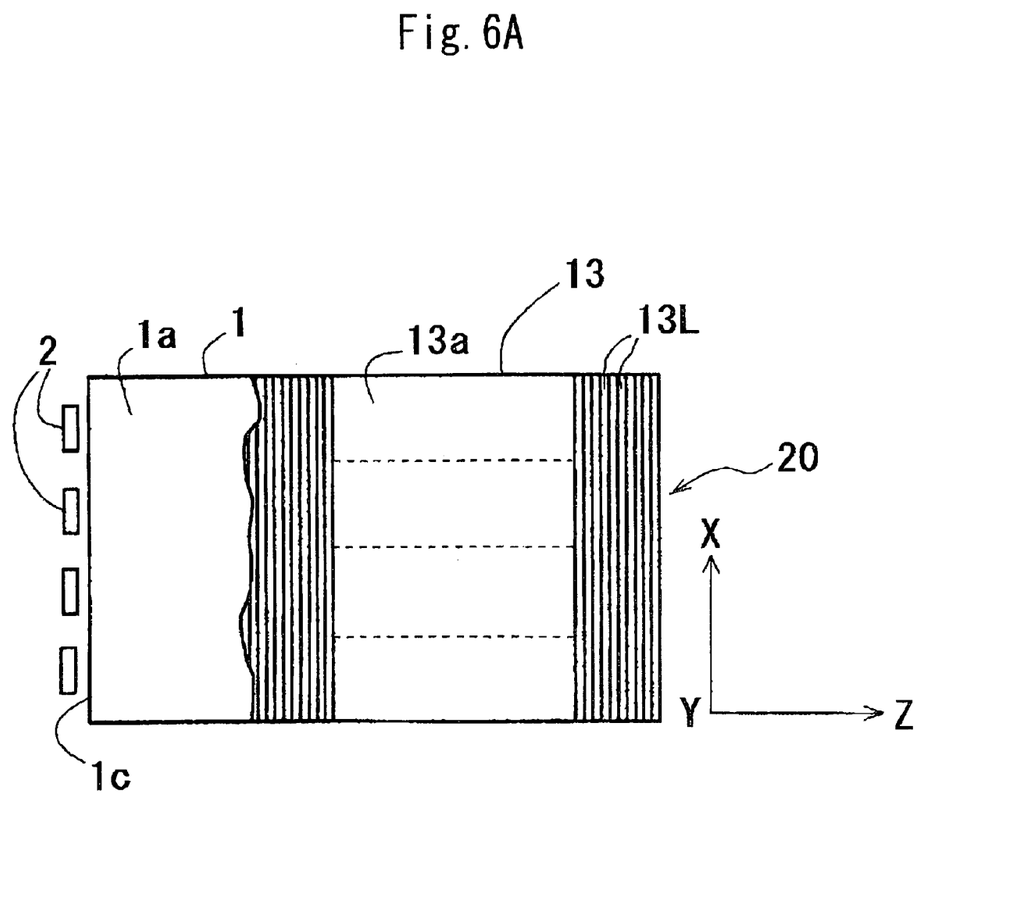
FIG. 6A is a top plan view showing a backlight system in a second embodiment according to the present invention.
Figure 6B:
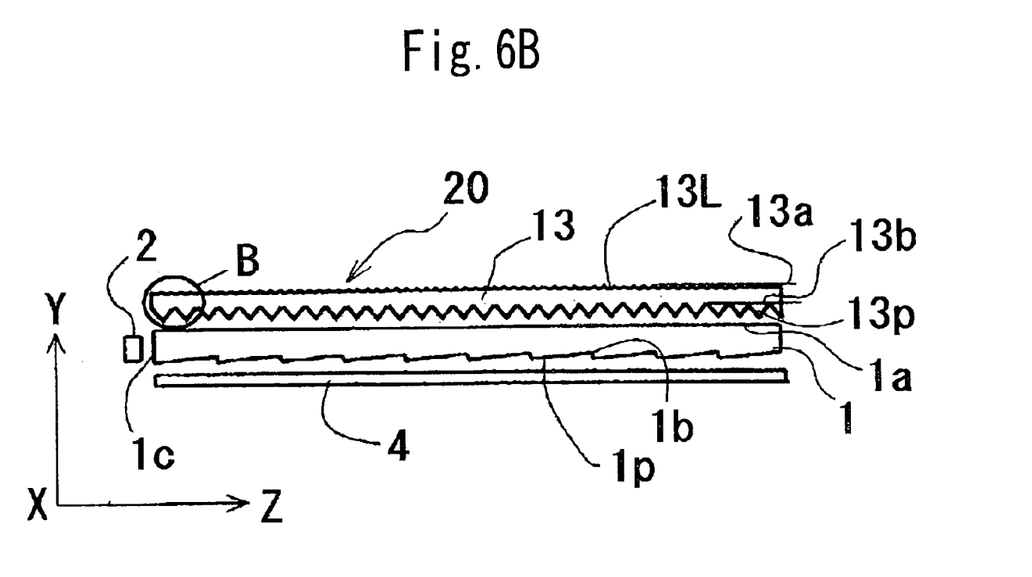
FIG. 6B is a side view of the backlight system as viewed from X direction in orthogonal coordinates X Y and Z.
Figure 6C:
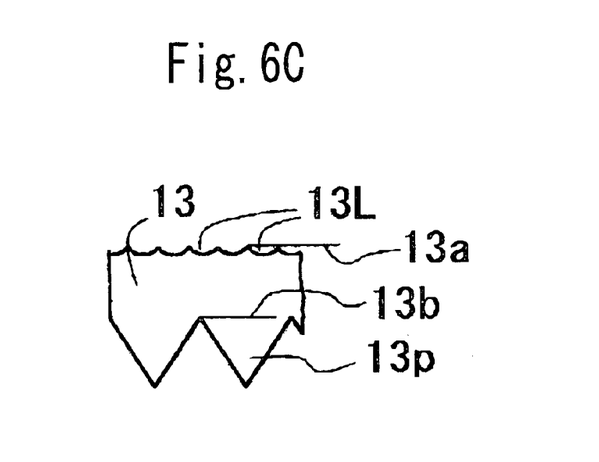
FIG. 6C is an enlarged view of a portion B in FIG. 6B.

A structure of a backlight system 20 in the second embodiment is shown in FIGS. 6A to 6C. In FIGS. 6A to 6C, reference numeral 13 denotes a prismatic sheet. The prismatic sheet 13 is made of a transparent plastic, and a lower surface 13b facing the light-guiding plate 1 is provided with a plurality of prisms 13p similar to the prisms 3p, shown in FIGS. 1A to 1D.

In the second embodiment, a lens mechanism similar to the lens mechanism in the first embodiment is provided on an upper surface 13a of the prismatic sheet 13 opposite to the lower surface 13b on which the prisms 13p are formed. The lens mechanism has a plurality of lenticular lens parts 13L, which are continuously disposed. Each of the plurality of lenticular lens parts has a surface, which faces to the object and is formed in a concave shape, and disposed to extend in parallel with the light-entrance surface 1c of the light-gliding plate 1.

Here, ridge lines of the prisms 13p and lenticular lens parts 13L extend together in the X direction and in parallel with respect to each other.

Meanwhile, the parts other than the prismatic sheet 13 of the backlight system 20 and reference numerals thereof are the same as these in the backlight system 10 in the first embodiments as shown in FIG. 1. In other words, in the second embodiment, an operation of each of the light-guiding plate 1 and the reflecting sheet 4 is the same as that in the first embodiment.

Figure 7:
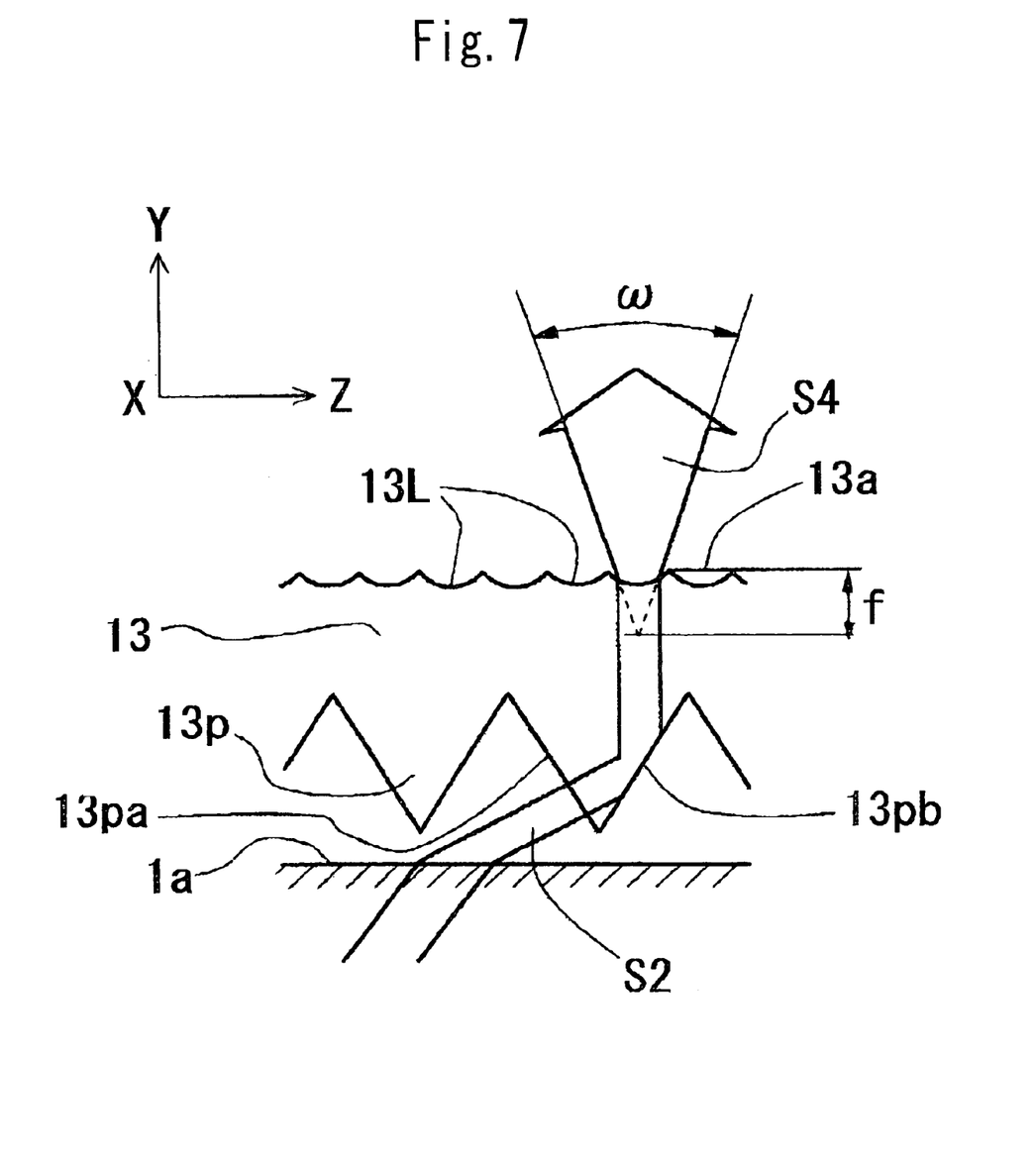
FIG. 7 is a view showing an operation of a prismatic sheet used in the backlight system shown in FIG. 6A.

Therefore, in particular, an operation of the prismatic sheet 13 is described as follows.

FIG. 7 illustrates the operation of the prismatic sheet 13 of the backlight system 20 in the second embodiment. As shown in FIG. 7, the emitted beam S2 from the upper surface 1a of the light-guiding plate 1 at the exit angle φ (see FIG. 2) enters the left inclined surface 13pa of each of the prisms 13p provided on the lower surface 13b of the prismatic sheet 13 facing the light-guiding plate 1, and similarly as in the first embodiment, the beam is reflected on the right inclined surface 13pb at an angle close to 90 degrees, goes approximately perpendicularly upward or the Y direction, arrives at the concave lenticular lens parts 13L formed on the upper surface 13a of the prismatic sheet 13 and then passes through the surfaces of the concave lenticular lens parts 13L by the refraction thereof and is emitted therefrom to the outside. Each of the lenticular lens parts 13L curves downwardly in a concave shape in the ZY plane in FIG. 7, and extends straightly in a state of holding the curved shape in a perpendicular direction to the paper surface of FIG. 7, or the X direction. The emitted beam from the lenticular lens parts 3L is dispersed by refraction of concave lenses of the lenticular lens parts, in the Z direction with an angle ω in such a manner that an inside position remote by a focal length f from the surfaces of the lens parts becomes a virtual light source in the ZY plane, thereby forming a final illumination beam S4. Consequently, the width of the directivity of the final illumination light from the backlight system 20 in the Z direction is more increased than that in the conventional art so as to take a balance with the width of the directivity in the X direction so that the quality of illumination is improved, similarly as the directivity of the backlight system 10, as shown in FIG. 5.

As described above, according to the present invention, it is possible to provide a backlight system having an excellent directivity of light to the object to be irradiated.

Although the preferred embodiments of the present invention have been described, the present invention is not limited to these embodiments. It is apparent to those skilled in the art that various changes and modifications can be made for the embodiments.

What is claimed is:

1. A backlight system comprising:
   a light-guiding plate having an upper surface, a lower surface and a light-entrance surface;
   a light emitting source disposed to face the light-entrance surface of the light-guiding plate; and
   a prismatic sheet disposed at a position facing the upper surface of the light-guiding plate and having a final exit surface for light disposed to face an object to be irradiated,
   wherein light emitted from the light emitting source enters the light-guiding plate, and the light is adapted so as to change the path thereof in the light-guiding plate, and then the light is emitted from the upper surface of the light-guiding plate and enters the prismatic sheet, and the light is adapted so as to adjust the direction thereof in the prismatic sheet to irradiate illumination light emitted from the final exit surface of the prismatic sheet to the object, and
   wherein the prismatic sheet includes a plurality of prisms on a surface of the prismatic sheet that faces the light-guiding plate and a plurality of lenticular elements on the final exit surface and the prisms and lenticular elements are dimensioned and arranged such that each prism is associated with, and directs light to, more than one lenticular element.

2. The backlight system according to claim 1, wherein each of the plurality of lenticular lens parts has a surface, which faces the object and forms a convex shape, and each of the convex shapes is disposed continuously to extend in parallel with the light-entrance surface of the light-guiding plate.

3. The backlight system according to claim 1, wherein each of the plurality of lenticular lens parts has a surface, which faces the object and forms a concave shape, and each of the concave shapes is disposed continuously to extend in parallel with the light-entrance surface of the light-guiding plate.

4. The backlight system according to claim 1, wherein the prisms comprise a plurality of concave and convex shapes which are continuously disposed, and ridge lines of the concave and convex shapes are formed to extend in parallel with the light-entrance surface of the light-guiding plate.

5. The backlight system according to claim 1, further comprising prisms provided on the lower surface of the light-guiding plate, wherein each of the prisms on the lower surface of the light-guiding plate has a large prismatic surface that is inclined at a small angle toward the light-guiding plate to face light emitted from the light emitting source.

6. The backlight system according to claim 5, wherein the prisms comprise a plurality of concave and convex shapes which are continuously disposed, and ridge lines of the concave and convex shapes are formed to extend in parallel with the light-entrance surface of the light-guiding plate.

7. The backlight system according to claim 1, further comprising a reflecting sheet disposed at a position facing the lower surface of the light-guiding plate, wherein the reflecting sheet is adapted so as to reflect light which passes through the light-guiding plate and return the light to the light-guiding plate.

8. The backlight system according to claim 1, wherein each of the lenticular elements has a smoothly curved convex or concave shape.

* * * * *